US007319545B2

(12) United States Patent
Linder et al.

(10) Patent No.: US 7,319,545 B2
(45) Date of Patent: Jan. 15, 2008

(54) METHOD AND APPARATUS FOR CALIBRATION OF A COLOR PRINTER

(75) Inventors: Stephen F. Linder, Fairport, NY (US); Zhenhuan Wen, Rochester, NY (US); Peter D. McCandlish, Pittsford, NY (US); Yingjun Bai, Webster, NY (US); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 986 days.

(21) Appl. No.: 10/623,944

(22) Filed: Jul. 21, 2003

(65) Prior Publication Data

US 2004/0114164 A1 Jun. 17, 2004

Related U.S. Application Data

(60) Provisional application No. 60/434,195, filed on Dec. 17, 2002.

(51) Int. Cl.
*G06F 15/00* (2006.01)
(52) U.S. Cl. .................. 358/1.9; 358/504; 358/518; 358/515; 358/520; 358/534; 358/537
(58) Field of Classification Search ............... 358/504, 358/518, 515, 520, 534, 537, 1.9
See application file for complete search history.

(56) References Cited

U.S. PATENT DOCUMENTS

| 4,500,919 | A |   | 2/1985  | Schreiber       | 358/78  |
|-----------|---|---|---------|-----------------|---------|
| 4,972,275 | A |   | 11/1990 | Spitz et al.    | 360/55  |
| 5,107,332 | A |   | 4/1992  | Chan            | 358/80  |
| 5,185,004 | A |   | 2/1993  | Lashinski       | 604/95  |
| 5,293,258 | A | * | 3/1994  | Dattilo         | 358/518 |
| 5,371,615 | A | * | 12/1994 | Eschbach        | 358/515 |
| 5,452,112 | A |   | 9/1995  | Wan et al.      | 358/504 |
| 5,537,576 | A |   | 7/1996  | Perets et al.   | 395/477 |
| 5,604,567 | A |   | 2/1997  | Dundas et al.   | 399/39  |
| 5,612,902 | A |   | 3/1997  | Stokes          | 364/526 |
| 5,625,716 | A |   | 4/1997  | Borg            | 382/254 |
| 5,649,072 | A |   | 7/1997  | Balasubramanian | 395/109 |
| 5,739,927 | A |   | 4/1998  | Balasubramanian et al. | 358/518 |
| 5,760,913 | A |   | 6/1998  | Falk            | 358/298 |
| 5,809,213 | A | * | 9/1998  | Bhattacharjya   | 358/1.6 |
| 5,818,960 | A |   | 10/1998 | Gregory, Jr. et al. | 382/167 |
| 6,141,120 | A |   | 10/2000 | Falk            | 358/504 |
| 6,157,469 | A | * | 12/2000 | Mestha          | 358/504 |
| 6,215,562 | B1|   | 4/2001  | Michel et al.   | 358/1.9 |
| 6,222,934 | B1|   | 4/2001  | Tsai            | 382/112 |
| 6,243,133 | B1| * | 6/2001  | Spaulding et al. | 348/223.1 |
| 6,384,918 | B1| * | 5/2002  | Hubble et al.   | 356/402 |
| 2003/0086090 | A1| * | 5/2003 | Tandon et al.  | 356/419 |

\* cited by examiner

*Primary Examiner*—Kimberly Williams
*Assistant Examiner*—Michael Burleson

(57) ABSTRACT

A method permitting an end user to recalibrate a color reproduction device. The color reproduction device includes a device for converting the native color values of the scanner into a device independent color space, a test target, and the desired values of each patch of the test target. The method includes printing the test target and scanning it with a scanner that forms a part of the color reproduction device. The device compares the desired values with the values obtained from scanning the printed test target to obtain a set of adjustment values to compensate for drift in the output of the color reproduction device. The compensation emphasizes restoration of the overall gray balance of the color reproduction device and can be implemented by modifying the tone reproduction curves or the halftone process used in the color reproduction device.

8 Claims, 5 Drawing Sheets

METHOD AND APPARATUS FOR CALIBRATION OF A COLOR PRINTER

This application is based on a Provisional Patent Application No. 60/434,195, filed Dec. 17, 2002.

FIELD OF INVENTION

This invention relates to the field of color reprographic devices, and in particular to ways of maintaining them in a known state.

BACKGROUND AND SUMMARY

As the number of color printers in common use has increased over the past decade, end users of such devices have become aware of the need to recalibrate these devices. Because of the nature of color reproduction, color printers are more subject to drift than are their black and white counterparts. One cause of such drift is deviation of the underlying components due to age or changes in the environment. For example, a typical color printing device is likely to vary due to changes in the underlying marking process in response to external conditions like temperature and humidity, and internal changes due to aging of the components. These variations from a known, standard state, can result in undesirable variation in the appearance of the output from such reprographic devices. Compounding this problem of drift is the sensitivity of human perception, which, for certain colors, emphasizes even minor shifts or differences in color.

While it is possible to include elaborate process controls within the color reprographic device to control its properties, they are often too expensive or cumbersome to be useful in general office reprographic systems. Accordingly, there have been proposed several methods that would allow an end user to recalibrate the printer, that is, restore it to some standard condition so that its reprographic properties may guarantee reliable and consistent color reproduction.

One such calibration method requires users undertake periodic manual calibration processes. In a typical such manual calibration, the user prints out a test page and then examines the page, perhaps visually comparing it to a known sample, to determine what adjustments need to be make. U.S. Pat. No. 5,604,567 to Dundas et al. describes one such calibration process. While such manual recalibration processes help alleviate the process to some extent, they are not as dependable as full feedback process controls, and have the drawback that they rely on the subjective judgement of the user to evaluate the test target. In addition, they are prone to errors if the user enters the recalibration data incorrectly. Systems which rely on use external densitometers, spectrophotometers, or other measuring devices to determine the recalibration are more reliable and can alleviate the problems associated with the manual methods, but require the use of expensive and complex measuring devices that are not normally used in office environments.

As scanners became more in common office environment, and in fact are included in much modern color reprographic devices, several solutions to the problem of calibration using a scanner as a substitute for a densitometer have been proposed. These include, among others, U.S. Pat. No. 5,107,332 to Chan, U.S. Pat. No. 5,452,112 to Wan et al., U.S. Pat. No. 5,537,576 to Sherman et al., U.S. Pat. No. 5,760,913 to Falk et al., U.S. Pat. No. 5,809,213 to Bhattacharya, U.S. Pat. No. 6,141,120 to Falk et al., U.S. Pat. No. 6,185,004B1 to Lin et al., and U.S. Pat. No. 6,215,562B1 to Michel et al. Each of these references describes some way to combine various targets and standards to use with the scanner to develop a way to compensate for drift in the various components of the color reproduction device. However, as a scanner may exhibit some drift due to variations in lamp intensity or aging of the lamp causing a color shift, or the imaging sensor in the scanner may age, many of these methods still require multiple steps to separately calibrate the scanner, or the use of extra auxiliary targets to supplement any calibration targets. Additionally, these methods often can be thus cumbersome to use, time consuming, and may also be dependent on the state of a separate target that must be maintained in good condition to ensure the accuracy of the calibrations produced.

In accordance with the teachings herein there is disclosed a system and method to enable periodically recalibrate a color reprographic device to maintain it in a known state that can be readily performed by a user. In one embodiment, a conventional scanner that is included in the color reprographic device is employed as a colorimeter. The reprographic device includes a calibration conversion table and a stored copy of a color target to be printed by the output portion of the color reprographic device. By scanning the printed target and passing the scanned image through the calibration conversion table, a set of color measurements are obtained which can be used to derives a set of curves that modifies output characteristics of the device to compensate for internal drifts and restore it to a standard, known state. Focusing on maintaining the overall gray balance and linearity of the printer for neutral and near neutral colors has the effect of minimizing the customer perceived variation from its standard state.

In accordance one or more aspects of the teachings herein, there is provided: a color reproduction system with drift correction, comprising: a scanner for scanning a document to generate scanned image data representative of the document, the scanned image data providing a color representation of the document; an output device for generating an output document in response to print ready data; and an image processing system receiving the said scanned image data and generating the print ready data, the image processing system device further comprising a calibration target comprising a set of digital signals representing a plurality of color test patches, a calibration conversion processor for converting the scanned image data into a set of device independent color signals, a calibration processor for computing a set of color shift correction signals by comparing the device independent color signals representative of a printed version of said calibration target with the stored representation thereof, and, an adjustment processor operating to adjust a characteristic of the print ready data in response to said color shift correction signals.

In accordance one or more aspects of the teachings herein, there also provided a method of maintaining the reproduction properties of a color reprographic device. The method comprises causing the device to print a copy of a stored test pattern containing a plurality of colored patches; scanning the printed target with a scanner to obtain a first set of color signals; processing said first set of color signals to obtain average values for the color of each patch in the test target; processing said average values using a color conversion processor to obtain device independent color values for each patch in the test target; comparing the device independent color values to a stored set of standard values; and from the comparison between the measured and the standard values deriving a correction that can be applied to the output means of the color reprographic device to restore it to a standard condition.

BRIEF DESCRIPTION OF THE DRAWINGS

The teachings and embodiments disclosed herein are described in detail with reference to the following drawings, wherein like numerals will refer to like elements, and wherein.

DETAILED DESCRIPTION

Figure 1:
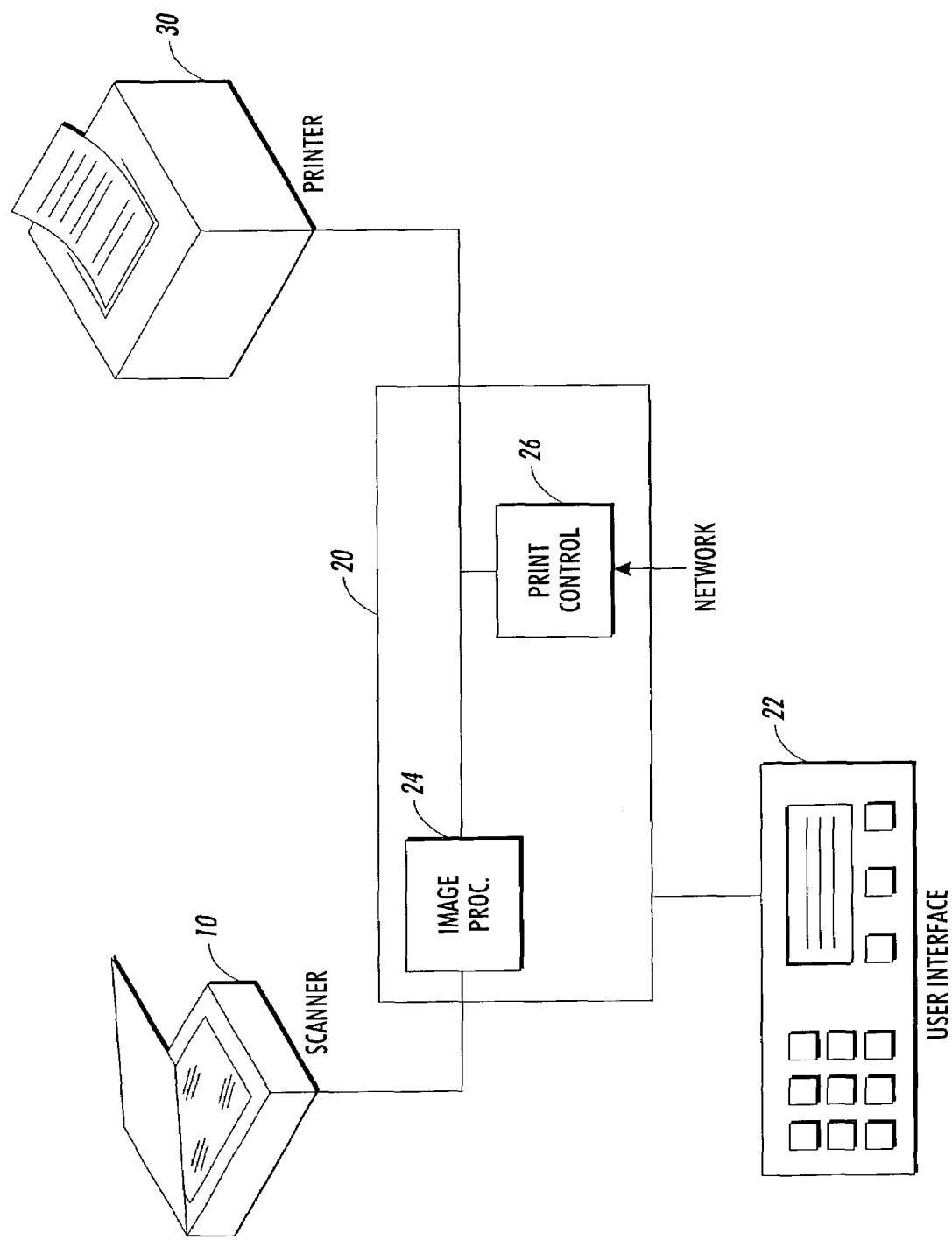
FIG. 1 shows an overview of a typical color reprographic device which may incorporate one or more aspects of the embodiments disclosed herein.

Referring to FIG. 1, there is shown the major components of a typical color reprographic system which may incorporate one or more aspects of the embodiments disclosed herein. The color reprographic system includes input scanner 10, control module 20, and output printer 30. The control module contains a user interface 22 to allow the users of the device to enter control information, for example the number of copies to be made, image processor 24, and an optional network processor 26 which that can accept print commands from an external source and convert them to rasters suitable for printing on the output printer.

When the device is used as for copying hardcopy originals, the original to be copied is placed on the scanner and a command is given from the user interface 22, to initiate the copying process. Scanner 10 scans the original to generate electronic image of the page to be reproduced. Image processing module 24 accepts the electronic image from the scanner 10 and applies the appropriate processing to convert the scanner output to a form suitable for printing. The processing includes conversion from the color space of the scanner, usually some form of RGB coding, to the color space required by the printer, here assumed to be some form of CMYK, although alternate color spaces can be employed. Additional operations performed by image processor 24 could include enlargement or reduction of the image size, modifications to the color balance, and any others that are chosen by the user through manipulation of the user interface.

Figure 2:
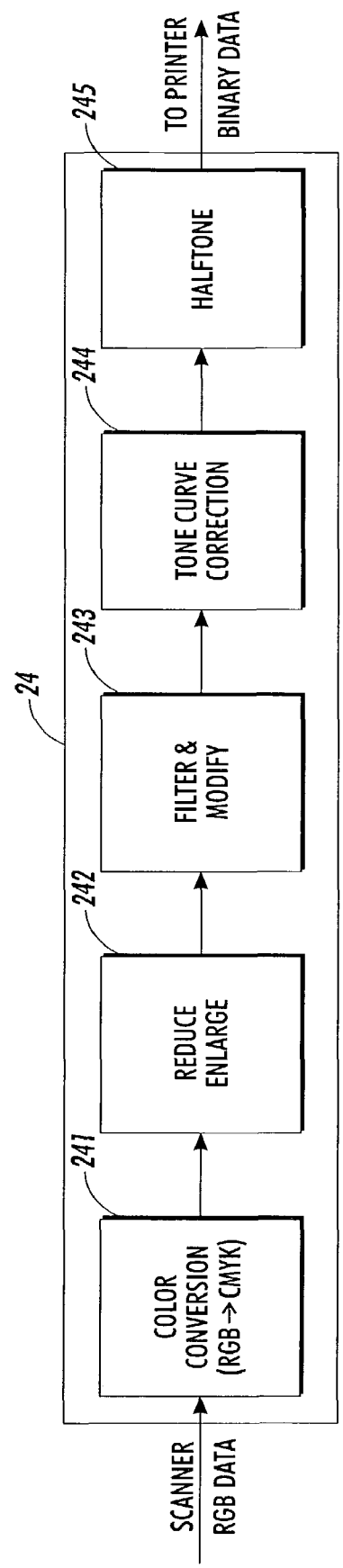
FIG. 2 shows the image processing components in a conventional control module.

Referring to FIG. 2, there is shown a schematic of the typical elements included in the image processing module 24. As shown in FIG. 2, image processing module 24 includes a color space conversion module 241 to convert the RGB of the scanned image data to the CMYK required by the output printer. The converted image data is then processed through a reduction/enlargement module 242 to perform any reduction or enlargement in image size, a filter module 243 to perform any further filtering or image modification such as color balance, a tone response curve module 244 to compensate for the tone response curve of the printer, and a halftone module 245 to halftone the data for the output printer. While the order of these processing modules may change and some of their functions may be combined in various color reprographic devices, such elements will be readily recognized by those skilled in the art as the principal elements in the image processing section of a color reprographic device. When the reprographic device is operating properly, the output copy will be a reproduction of the original, usually a faithful copy, but in any case one that meets the requirements set by the user.

The teachings herein are directed to aspects of a reprographic system such as the device shown in FIG. 1. In particular, the teachings herein employ the scanner associated with a color reproduction device as the color measurement apparatus. Modern scanners presently available have achieved a level of performance where the design and associated process controls in the scanner make the scanner a relatively stable device. Certainly for most purposes the drift associated with the scanner is much less than that associated with the printer unit. Accordingly, in accordance with the teachings herein, it is assumed that the scanner remains in a state that is sufficiently close to its design intent so that it does not need to be recalibrated. It is further assumed that most of the drift occurring within a color reprographic device that needs to be corrected is associated with the printer unit. Those of skill in the art will appreciate that although the above assumptions may not be accurate for the highest level of calibration accuracy; however, it has been found that such assumptions are more than sufficient for most general office uses as well as for some graphic arts applications.

In order to implement a recalibration procedure, the development of a standard test target is required. The target contains a number of color patches, spread across the color space of the output printer device. Printing the standard test target with a device provides an indication of the state of the device any associated drift therein. It has been found to be beneficial to include step wedges in the CMYK colorants, both solid primary and secondary (pairs of CMYK) colors, and in particular a large number of nearly neutral patches around the $a^*=b^*=0$ axis. The test target design should also include a design of the layout of the patches including possibly extra marks or patches to help identify the orientation of the target and thus, provided information as to the identity of particular patches. Further considerations may include randomization of the patches such that there is no particular dependence of one of the output colorants in either the horizontal or vertical direction. After the patches are defined in terms of their color and layout, the target design in implemented in some page description language (PDL) or other format that can be stored as part of the permanent memory of the image processing module. This will enable the image processing module to print the target during the customer operation of the recalibration process. As a final step during the design of the test target, the desired $L^*a^*b^*$ value for each patch is determined, either by measurement or by some combination of measurement and modeling. These desired $L^*a^*b^*$ values are stored in the image processing module, as desired aim values representing the calibration test target along with the instructions for printing the test target.

Figure 4:
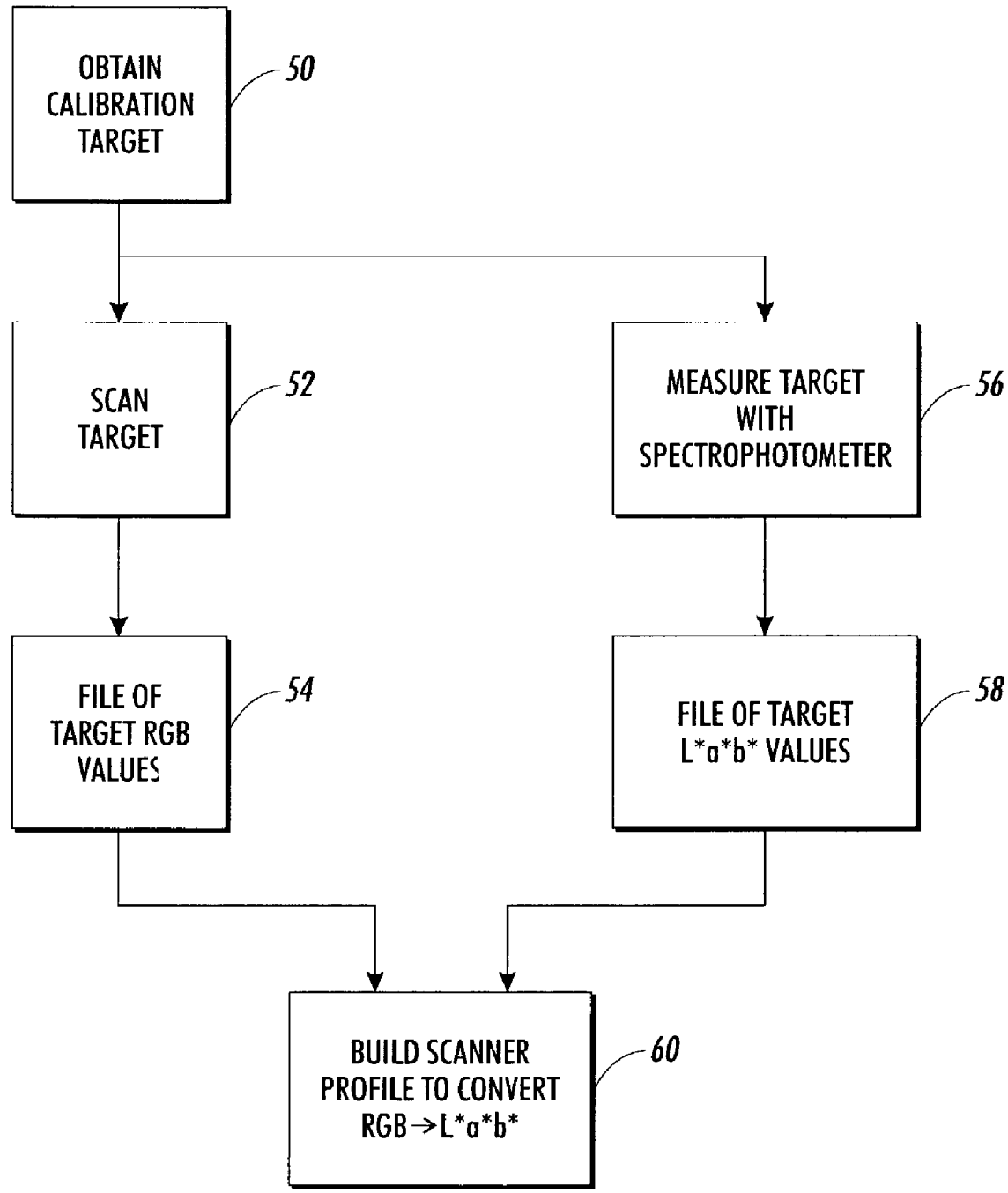
FIG. 4 illustrates an embodiment of a method to generate the scanner profile for the current disclosure.

FIG. 4 shows the steps needed to prepare the data elements for the current disclosure. First a calibration target of some form is obtained (step 50). The calibration target should contain a plurality of color patches representative of a range of colors. The calibration target may, but need not, comprise the same set of patches as designed into the standard test target. The calibration target is scanned using a scanner representative of the scanning device to be manufactured (step 52). Either a carefully controlled model of the scanner may be used, or alternatively, several samples may be used and the results averaged. Similarly, the calibration target may be scanned with multiple "representative" scanning devices and the results obtained therefrom may be averaged. The output of this scan is a set of RGB values for each patch in the calibration target. This set of set of RGB values is stored as target RGB values for the representative scanning device (step 54). In addition to the scanning values, a separate set of measurements is made, using a colorimeter to obtain L*a*b* values for each patch in the calibration target (step 56). The set of L*a*b* values for each patch in the target is compiled as a file of measured L*a*b* values (step 58). These two data sets, the RGB; values, and the L*a*b* values are then combined to generate a scanner profile, which can be used to convert RGB values to L*a*b* (step 60). The details of the scanner profile will depend on the particular method chosen to perform the conversion, ICC profile, 3D LUT or some other method. However, the generation of a scanner profile is well known to those skilled in the art.

Figure 3:
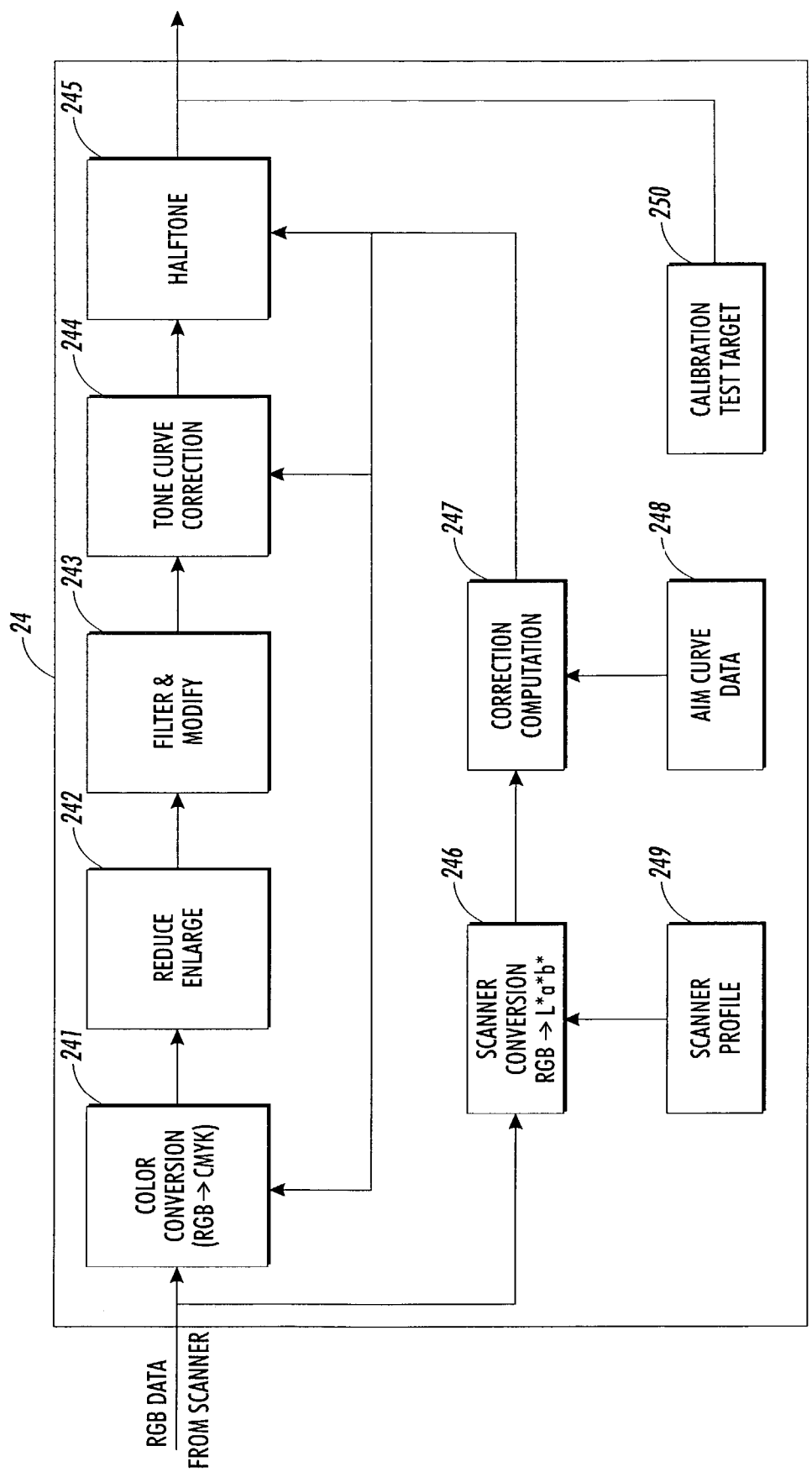
FIG. 3 shows an embodiment of the image processing components in the control module of a color reprographic device using the present disclosure.

Referring now to FIG. 3, there is shown an embodiment of an image processing module 24 modified with added functional elements to implement a proposed correction capability in accordance with the teachings herein. Briefly, as shown in FIG. 3, scanned RGB image data obtained from scanning a test target generated by the printer 30 is supplied to scanner converter module 246, which in response to the scanner profile 249, generates L*a*b* values for each patch in the target. These L*a*b* values are combined with the desired aim values 248, in the correction computation module, 247, to generate printer corrections. These can be fed back to an appropriate image processing modules, 241, 244, or 245 as chosen.

More particularly, image processing module 24 includes converter module 246, that performs a conversion between the device dependent color space of the scanner, here assumed to be RGB, and some device independent color space. Any of the well known HSV, CIE XYZ, and CIE L*a*b* systems can be used as the device independent color space. It has been found that using the CIE L*a*b* system gives good results, and thus, the embodiments herein will be described using this space. It should be appreciated that converter module 246 can be implemented in software, firmware, hardware or any combination thereof.

The method of converting from the scanner space into the device independent space can be done using several different algorithms. For example, one can implement a transformation using the International Color Consortium (ICC) profile method. This method, which is described in documents available from the ICC on their website at http://www.color.org, describes a method and file format for implementing a conversion from a device dependent RGB space into a device independent space. Alternatively, one may use well-known algorithms to develop a multidimensional look up table (LUT) that accepts the RGB values as input and has the corresponding device independent values as table entries. Such a table may be combined with interpolation methods to allow the table to be smaller than say 256×256×256 nodes. Methods for developing such transformations are well known to those who develop color reproduction devices and will not be described in further detail.

The scanner converter module 246 and the scanner profile 249 can be considered to comprise a calibration conversion processor for converting the scanned image data into a set of device independent color signals. When scanner profile 249 is implemented as a LUT, the converter module 246 operates to convert the scanned RGB data for the scanned test target using the LUT 249. Alternatively, scanner profile 249 is implemented as an ICC profile, the converter module 246 operates to convert the scanned RGB data using the information in the stored ICC profile 249 in accordance with ICC conversion procedures.

The device independent color signals from the converter module 246 (here considered to be L*a*b* values) are passed to the correction computation module 247, wherein the L*a*b* values are compared with the aim values 248 to generate printer corrections. In this manner, the correction computation module 247 and the desired aim values 248 can be considered to comprise a calibration processor which generates a set of color shift correction signals that can compensate for any shifts in the color reproduction properties of the output printer unit by comparing the device independent color signals representative of a printed version of said calibration target with the desired aim values. As should be appreciated, these color shift correction signals can take several different forms as described in detail below.

Figure 5:
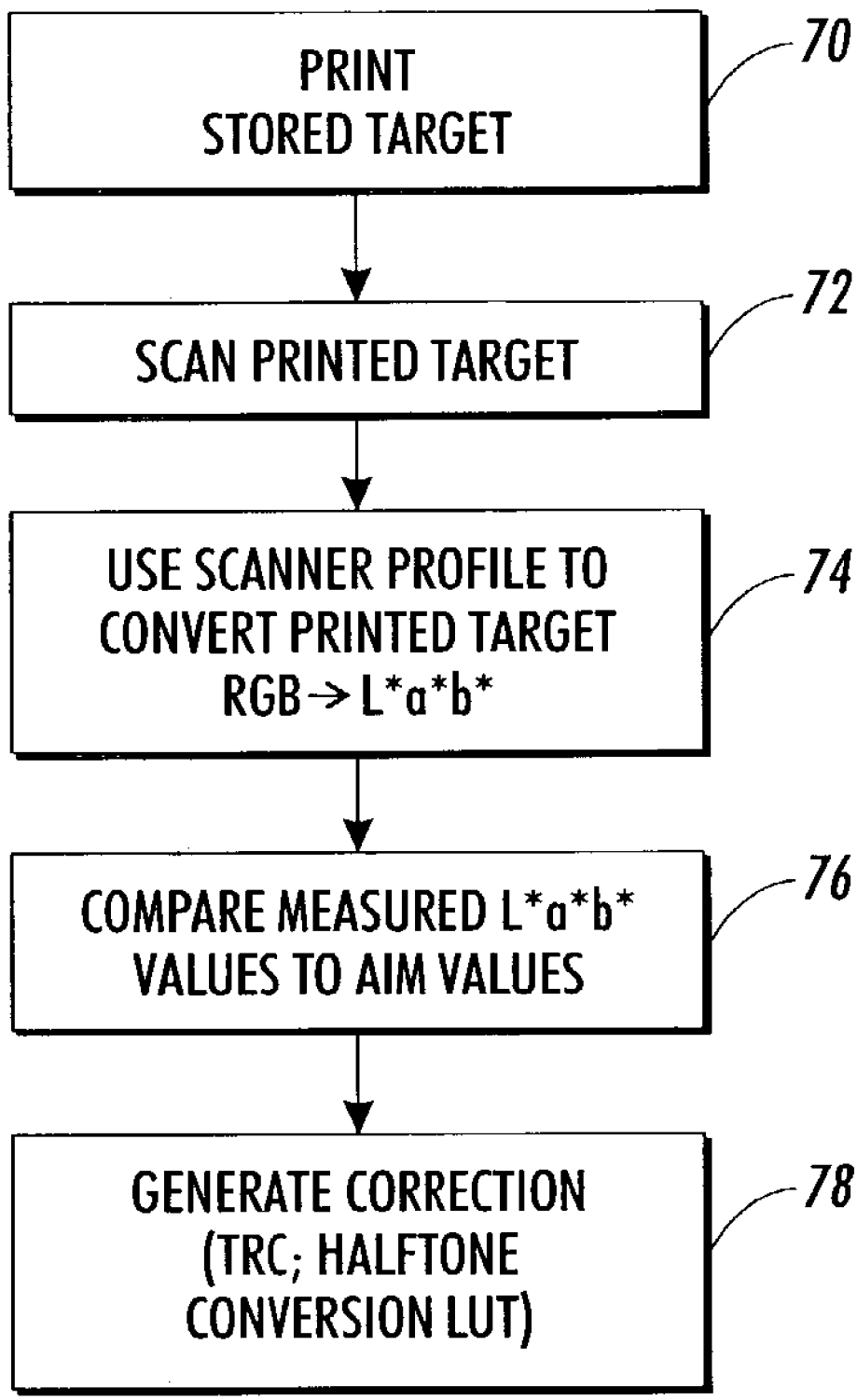
FIG. 5 illustrates an embodiment of a method to recalibrate a printer in accordance with the present disclosure.

The steps in the process to be described are shown in FIG. 5. To execute the recalibration process the customer, through the user interface 22, requests that the calibration test target 250 stored in the controller be printed (step 70). The customer then takes the output sheet or sheets places them in the input to the scanner and, again through the user interface 22, causes them to be scanned (step 72). As each sheet is scanned the image is temporarily stored in the image processing module. Software in the module then analyzes each patch, taking an average over all or a portion of each patch to get an average RGB value for each patch in the target. During the analysis, the software may also check the page image to determine the orientation of the page in the scanner. If such software is included, it will allow the user to place the page or pages in the scanner in any orientation without compromising the quality of the recalibration. As each patch's RGB values are determined, the calibration conversion processor (the scanner converter module 246 and the scanner profile 249) employing a LUT, ICC profile conversion or other transform method implemented during the design of the color reproduction device is invoked to derive an L*a*b* value for each patch (step 74).

By comparing (step 76) the L*a*b* values measured by the scanner-transform combination 246, 249 with the aim values 248 stored in the image processing module, a set of corrections may be derived that can compensate for any shifts in the color reproduction properties of the output printer unit (step 78). These corrections can take several different forms. It has been found that a useful form for the set of corrections is one where the tone curve and gray balance of the output printer is maintained. The output tone curve is often made to be linear in some observable quantity, like for example, L* vs. digital value. However, it is not always necessary that the output be made linear, but often it is merely made to follow some predetermined curve, that is specified at the time the color reprographic device is designed. It has further been found that the additional constraint of maintaining overall gray balance, that is of having equal RGB or CMY(K) values represent neutral colors, comprises an important characteristic of a color reprographic device. Shifts in the overall gray balance, where one or more of the colorants are unbalanced, giving nominal neutral colors some degree of color shift produces undesirable results. It has also been found that correcting these shifts in gray balance corrects for many defects that are objectionable to users. The inclusion of a large number of neutral and near neutral colors in the test target provides information as to the degree and extent of the color shift.

Having such a proportion of neutral and near neutral colors increases the sensitivity of the recalibration process to shifts in the gray balance of the output printer module.

There are a number of different ways to make such an adjustment. In one such embodiment, the image-processing unit contains several separate processing elements. For purposes of the describing the present embodiment, it is assumed that a set of curves, often called tone reproduction curves (TRCs), used to correct for possible nonlinear response of the output printer unit are resident in either the image processing module or the printer unit. That is, after the input values from the scanner are converted to the CMYK values needed by the output printer unit, the CMYK values processed through a set TRCs to correct for a nonlinear response of the printer unit. The tone reproduction curves are indicated by element 244 in FIG. 2 and FIG. 3. Generally, it is easier to design the overall image processing module if the conversion from RGB to CMYK assumes that equal CMY values will produce neutral colors on the output device. While most color printer devices do not actually behave in such a fashion, the set of TRCs can be used to compensate for the gray imbalance as well as the nonlinearity of the output printer device. It has been found that many of the drifts in the output printer unit that produce the most customer concern, involve shifts in the relative balance of the CMY colorants that produce a gray imbalance. This is the reason for the emphasis on near neutral colors in the test target. One procedure recalculates the TRC set from the comparison of the scanned test target and the aim values. This new TRC set can be used in place of the previously stored set to compensate for drift of the output printer unit.

An alternative procedure might be used is to follow the process described in U.S. Pat. No. 5,625,716 to Borg, herein incorporated by reference. In the process taught by Borg, a halftone for the output printer unit is designed with a large (>256) number of levels. A set of 256 levels is then selected from this larger set to compensate for nonlinearity of the printer unit. If such a technique were to be used with the present invention, separate halftones with a large number of levels would be designed for each of the colorants in the output printer unit. During the recalibration, a new set of 256 levels would be picked for each colorant that would ensure that the output of the printer was gray balanced and linear.

While the previous description has been focused on using a scanner that is part of a color reproduction device, it is not necessary to confine the implementation to such a device. Indeed, any suitably calibrated scanner can be used as the substitute color measuring device. For example a separate scanner could be used that is connected to a network to enable such a scanner to be used to calibrate many color reprographic devices.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A color reproduction system with drift correction, comprising:
    an output device having a set of tone reproduction compensation curves for rendering an image on a recording medium;
    said output device generating, using said set of tone reproduction compensation curves, an output document having a plurality of color test patches;
    a scanner for scanning said output document having said plurality of color test patches to generate scanned image data representative of said plurality of color test patches, the scanned image data providing a color representation of said plurality of color test patches; and
    an image processing system receiving said scanned image data and generating print ready data;
    said image processing system device including,
        a calibration target generator to generate, from a set of digital signals, a calibration target, to be printed, representing a plurality of color test patches,
        a calibration conversion processor to convert the scanned image data into a set of device independent color signals,
        a calibration processor for computing a set of color shift correction signals by comparing the set of device independent color signals with a set of desired color signals, and
        an adjustment processor to re-calculate a set of tone reproduction compensation curves in response to said color shift correction signals and to cause said re-calculated set of tone reproduction compensation curves to replace the set of tone reproduction compensation curves in said output device.

2. The apparatus of claim 1 wherein the conversion processor uses a 3 dimensional lookup table.

3. The apparatus of claim 1 wherein said adiustment processor re-calculates the set of tone reproduction compensation curves to maintain the overall gray balance of said output device.

4. The apparatus of claim 1 wherein the calibration target has a plurality of patches that are neutral or near neutral in color.

5. The apparatus of claim 1 wherein the scanner may be separate from the other elements and connected thereto by a network.

6. A method of maintaining the reproduction properties of a color reprographic device comprising:
    causing the color reprographic device to print a copy of a stored test pattern containing a plurality of colored patches;
    scanning the printed target with a scanner to obtain a first set of color signals;
    processing the first set of color signals to obtain an average device dependent color values for each patch in the test target;
    converting the average values using a color conversion processor to obtain a device independent color values for each patch in the test targetT:
    comparing the device independent color values to a stored set of standard values to generate a set of color shift correction signals:
    re-calculating a set of tone reproduction compensation curves in response to the set of color shift correction signals; and
    replacing a set of tone reproduction compensation curves in the color reprograghic device with the re-calculated set of tone reproduction compensation curves.

7. The method of claim 6, wherein the color conversion processor uses a 3 dimensional lookup table.

8. The method of claim 6 wherein the set of tone reproduction compensation curves are re-calculated to maintain the overall gray balance of the output device.

* * * * *